(12) United States Patent
Spencer

(10) Patent No.: US 6,356,646 B1
(45) Date of Patent: Mar. 12, 2002

(54) METHOD FOR CREATING THEMATIC MAPS USING SEGMENTATION OF TERNARY DIAGRAMS

(76) Inventor: Clyde H. Spencer, 11331 McKellar Dr., Sonora, CA (US) 95370-9078

( * ) Notice: Subject to any disclaimer, the term of this patent is extended or adjusted under 35 U.S.C. 154(b) by 0 days.

(21) Appl. No.: 09/252,718

(22) Filed: Feb. 19, 1999

(51) Int. Cl.$^7$ ................................................. G06K 9/00
(52) U.S. Cl. ....................................... 382/103; 348/144
(58) Field of Search ........................ 382/103; 348/144, 348/145, 146, 147, 149

(56) References Cited

U.S. PATENT DOCUMENTS

| | | | |
|---|---|---|---|
| 3,829,218 A | | 8/1974 | Alayanak ...................... 356/74 |
| 3,984,671 A | | 10/1976 | Fletcher et al. ............. 235/181 |
| 4,037,048 A | | 7/1977 | Walker ........................ 358/113 |
| 4,139,862 A | * | 2/1979 | Haskell et al. ................. 348/3 |
| 4,167,729 A | | 9/1979 | Christenson et al. .... 340/146.3 AH |
| 4,678,911 A | | 7/1987 | Sundberg et al. ........... 250/253 |
| 4,766,551 A | | 8/1988 | Begley ........................ 364/498 |
| 4,885,697 A | | 12/1989 | Hubner ....................... 364/497 |
| 5,206,918 A | | 4/1993 | Levene ........................ 382/17 |
| 5,479,255 A | | 12/1995 | Denny et al. ................ 356/319 |
| 5,790,188 A | * | 8/1998 | Sun ............................. 348/144 |

OTHER PUBLICATIONS

Anon (1996), ENVI User's Guide, The Environment for Visualizing Images, Ver. 2.5, Research Systems, Inc, Boulder, CO, pp. 4–35 to 4–37.

Haralick, Robert M., et al. (ed.), (1983), Ch. 18: Pattern Recognition and Classification, in Manual of Remote Sensing (Colwell, R. N., ed.), ASPRS, Falls Church, VA, pp. 793–805.

Chavez, Pat S. (1989), Radiometric Calibration of Landsat Thematic Mapper Multispectral Images, PE&RS, vol. 55, No. 9, Sep. 1989, pp. 1285–1294.

King, Thomas A., et al. (1987), "Color Space Mapping Using Ternary/Chromaticity Diagrams," in Proc. 5th Thematic Conf. Remote Sensing for Exploration Geol., ERIM, Ann Arbor, MI.

King, Thomas A., et al. (1990), "Multispaectral Ratio Selection Using Ternary Diagrams," Bull. Assoc. Eng. Geologists, vol. XXVII, No. 1, pp. 93–102.

Anon (1980?), USGS MIPS documentation, http://terraweb.wr.usgs.gov.TRS/software/mips.

* cited by examiner

*Primary Examiner*—Leo Boudreau
*Assistant Examiner*—Abolfazl Tabatabai

(57) ABSTRACT

A method and process is disclosed for computer processing and display of remote sensing, multispectral imagery for the purpose of identifying ground targets and classifying the imagery to create thematic maps. The successful application relies on the use of images from optimal bands; those bands include a near-infrared, mid-infrared, and visible band. The percentages of each of the three bands are plotted on a ternary diagram (34), which is used as a graphical device to allow target identification. Additionally, the ternary diagram feature space is segmented to define thematic classes and allow thematic classification with a computer. Vegetation (10) and mineral clusters (11) are separated easily. Further discrimination within the separate vegetation (10) and mineral (11) point clusters is possible. A spectral library (49), convolved to the bandwidth of the employed multispectral sensor bandpasses, and converted to ternary percentages, is utilized to locate specific spectral targets. The graphical ternary diagram (34) and false-color multispectral image display (46) are linked in real-time through a lookup-table (43) to allow an operator to interactively alter each of them through a change to the other. Included is a method to accomplish automatic, hierarchical classification of the images without operator intervention. The percent of vegetation ground-cover (i.e. a vegetation index) can be estimated, and atmospheric scattering and absorption effects are empirically corrected, interactively.

12 Claims, 8 Drawing Sheets

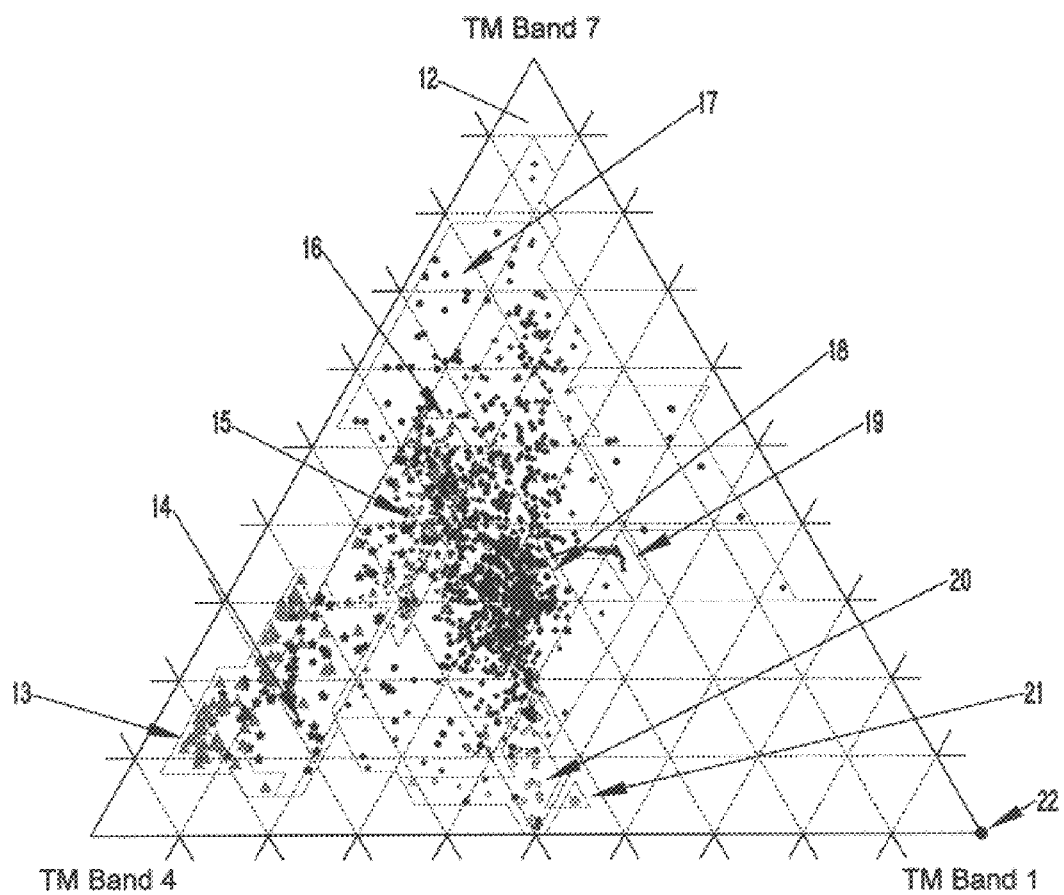

METHOD FOR CREATING THEMATIC MAPS USING SEGMENTATION OF TERNARY DIAGRAMS

BACKGROUND OF THE INVENTION

1. Technical Field

This invention relates to the computer processing and display of digital, multispectral imagery for the purpose of identifying ground targets and classifying the imagery to create thematic maps.

2. Description of Prior Art

Ground targets in imagery have been identified commonly through the subjective process of an art referred to as photointerpretation. This process relies on shapes, tones, textures, colors, and associations in the image to infer the nature of the ground feature. The results are highly correlated with the skill and experience of the photointerpreter.

Multispectral imagery is a collection of coregistered images (typically $<2^3$), each image being collected in a different, broad region of the electromagnetic spectrum commonly called a band. These bands are collected nominally between 0.400 μm (micrometers) and 2.500 μm wavelength; this region is generally referred to as the visible/infrared-red (VIR) region. The computer classification of multi-spectral imagery, to create thematic maps, has usually been of two general types, referred to as supervised and unsupervised.

In the case of supervised classification, regions within the image, that are believed to represent relatively homogeneous clusters of pixels (picture elements) that are characteristic of a particular type of ground cover of interest, are selected to be what are known as training sites. The selection can and most often does proceed by an experienced photointerpreter marking the boundaries of the training site with an on-screen cursor controlled with some pointing device such as a mouse, trackball, joystick, lightpen, or keyboard arrow-keys. The selection of particular training-site locations within an image, and their resultant shapes, is subjectively determined by an operator. The selection is based on their interpretation of the image and possibly is guided by information called "ground truth" obtained from on-site reconnaissance on the ground.

These training sites are then used by various computer algorithms, again commonly selected by an operator from a plurality of choices, and typically statistical in nature, (such as the Maximum Likelihood classifier) to sequentially test the spectral characteristics of every pixel in the image against the pixels in the selected training sites. The tests performed are for a similarity metric for each pixel with a plurality of multispectral bands that may represent all bands recorded or a sub-set selected by the operator. The definition of the agreement or similarity varies with the algorithm selected. The intent is to categorize or classify every pixel as being most like the pixels in a particular training site, when considered from the perspective of the n-dimensional feature space defined by the number of bands selected for the comparison.

In the unsupervised classification approach, an operator selects a particular algorithm from a plurality of choices commonly provided by the manufacturer of the image processing software. That algorithm then performs iterative comparisons in n-dimensional space, where n is the number of multispectral bands chosen by the operator to be considered. The comparisons result in every pixel being assigned to a cluster of spectrally similar pixels. If the statistical characteristics of any or all of the existing clusters exceed certain thresholds, either hardcoded by the software manufacturer or selected by the operator, clusters can be split or lumped together. After a pre-selected number of iterations, or alternatively a pre-selected number of clusters is attained, the program halts and displays the spectrally dissimilar clusters, wherein the clusters are commonly pseudo-colored to help in their visual differentiation. The operator must then subjectively decide what every cluster represents in terms of a ground target or type of ground cover. This is again accomplished through either photointerpretation procedures, or the collection of ground-truth from onsite inspection, or a combination of both.

Numerous band-ratios and indices, utilizing two bands, have been in use for years to accentuate spectral features. Thresholding a band-ratio (or vegetation index) can provide a binarized (two-level) classification of the images. Where to establish the threshold is subjective.

It can be seen that the subjective judgement of the operator is extremely important in obtaining accurate results for all the methods discussed above. Their experience is extremely important in making the subjective decisions. In addition, the availability of accurate ground truth is important in achieving good classification results. Although the algorithmic processing of the imagery can be performed for an n-dimensional feature space where n is greater than 1, the operator is constrained to only being able to see the effects of three bands at any one time. This affects the ability to either correctly select homogeneous training sites or properly identify the corresponding type of ground cover for a particular cluster-class derived from unsupervised classification. One does not know a priori what the best three multispectral bands are to help identify the various types of ground cover in the image.

An additional problem is that one can expect that every algorithm chosen will result in a classification of the ground cover that is different from the results of every other algorithm. The initial selection of an appropriate algorithm from the plurality of choices available will be influenced by the experience of the operator. The acceptance or rejection of the classification results will also be a subjective decision made by the operator. While there are objective tests of the accuracy of classification, even the interpretation of the tests is ultimately subjective.

A common problem in multispectral classification, particularly with high spatial-resolution imagery, is the incorporation and ambiguous identification of a shadow class. Related to this is, if the operator does not recognize the existence of one or more spectrally unique types of ground cover, those classes will be relegated to an 'unknown' or 'undefined' class with supervised classification.

Another approach for creating thematic maps, which has evolved in recent years, is an extension of multispectral remote sensing. If a sufficient number of as discrete bands of the electromagnetic spectrum are sampled, the resulting plot of the apparent reflectance of a ground target approaches a continuous, smooth curve. The imaging instruments that collect a very large number of bands, usually between about $2^6$ to $2^8$ narrow bands, nominally between 0.400 μm and 2.500 μm wavelength, are called hyperspectral sensors. The advantage of hyperspectral imagery is that, with careful calibration, correction of illumination variations, and compensation for atmospheric absorption and scattering effects, an apparent reflectance can be derived from the radiance values for every pixel; then the pixels can be compared to a library of laboratory-derived reflectance spectra for a match.

Thereby, ideally, the need for subjective judgement on the part of the operator is eliminated. However, the atmospheric corrections are not a trivial undertaking, the available spectral libraries are reasonably complete for minerals only, and the hyperspectral sensors are not extensively deployed as yet. The analysis and subsequent processing of hyperspectral imagery to create thematic maps is generally more difficult and requires a higher level of skill and experience than for multispectral imagery.

Multispectral (and hyperspectral) images are invariably displayed as a single false-color image created from a combination of three particular bands out of the total number of bands recorded. However, most remote sensing image processing software currently available only provides the ability to plot scattergrams from two bands simultaneously.

A ternary diagram (a.k.a. triangular plot) is a graphical plot based on the use of an equilateral triangle; it is used for displaying the relationship between three variables that are related in a manner such that they sum to unity or 100 percent, For plotting purposes, the triangle is internally subdivided into three sets of parallel lines, each set being parallel to one of the sides of the triangle. The lines, which may be hidden for clarity, represent percentages of each of the three components being plotted. These three variables are commonly referred to as end-members. Each apex of the triangle represents 100 percent of an end-member and the side of the triangle opposite a particular apex represents zero percent. A point in the center of the triangle represents equal proportions ($\frac{1}{3}$) of all three end-members. Ternary diagrams are tools frequently used in geology, metallurgy, and physical chemistry. A familiar use is in classifying soils by texture. In this application, the end-members are sand, silt, and clay. Dividing lines on the ternary diagram define boundaries for soil textural names, such as "loam." Ternary diagrams are exceedingly tedious to plot by hand and are subject to plotting error.

The U.S. Geological Survey Flagstaff Field Center wrote a computer program in 1980 called Mini Image Processing System (MIPS). It is available to the public for VAX and Unix operating systems. MIPS contains a module, called "Triplot," for displaying triangular plots of multispectral imagery. However, there is no indication that there is any awareness among the developers that particular band selections result in clusters of points that are separable into classes of materials. The documentation simply says, "Uses: If three multispectral images have been converted to reflectance, then the percentage of the total reflectance represented by each can be seen in the plot." MIPS also contains a module, called "Reflect," for converting raw data into ground reflectance.

Research Systems Inc. (Boulder, CO) markets and distributes a remote sensing software package written by Better Solutions Consulting LLC (Boulder, CO) called ENVI. It has a feature, that they call "dancing pixels," that links an image to a 2-D scatterplot (Cartesian coordinates). Pixels selected within a region of interest in the image are plotted on an orthogonal-axis scatterplot and, conversely, points selected in the scatterplot cause their corresponding pixels in the image to be highlighted. Again, however, there seems to be no awareness on the part of the developers that one can have any a priori knowledge about the identity association of the points in the scatterplot, or awareness of the value of any particular band combinations.

OBJECTS AND ADVANTAGES

Accordingly, besides the objects and advantages of multispectral classification as described in "Description of Prior Art" above, several objects and advantages of my invention, hereinafter referred to as "Ternary Multispectral Analysis," are as follows:

(1) To provide a means to identify ground reflectors without need for:
  (a) a highly skilled photointerpreter;
  (b) ground-truth;
  (c) more than three, broad bands available on the Landsat Thematic Mapper (TM) or similar multispectral sensors;

(2) To provide a means to locate spectral targets defined as particular types of ground cover;

(3) To provide a means to interactively classify multispectral imagery and thus generate thematic maps of ground cover without need for:
  (a) a highly skilled photointerpreter;
  (b) ground truth;
  (c) more than three TM bands;

(4) To provide a means to automatically classify multispectral imagery and thus generate a thematic map of ground cover without the need for:
  (a) an operator;
  (b) photointerpreter;
  (c) ground truth;
  (d) or more than three TM bands;

(5) To provide a means to minimize the impact of the 'shadow class' through an inherent normalization;

(6) To provide a means to estimate the proportion of end-members in a mixed-pixel;

(7) To provide a means to estimate turbidity and type of sediment in water;

(8) To provide a means to generate false-color imagery with constant colors for the same type of reflectors, and;

(9) To provide a means to interactively accomplish empirical corrections of atmospheric scattering and absorption for a multitude of multispectral bands.

Still further objects and advantages will become apparent from a consideration of the ensuing description and accompanying drawings.

SUMMARY OF THE INVENTION

The method and process of Ternary Multispectral Analysis disclosed herein includes image display, graphical visualization, image processing, mathematical techniques, and signal processing.

In accordance with the present invention, plotting of pixel values from multispectral images from appropriate Landsat TM (Thematic Mapper) and ETM+ (Enhanced Thematic Mapper Plus) bands (or their equivalents) on a ternary diagram results in a feature space display that effectively clusters vegetation separately from minerals. Further, minerals are separated as a cluster along a major symmetry-axis of the triangle and have lesser dispersion at approximately right angles to the general elongation of the mineral cluster. Additionally, various kinds of vegetation are dispersed along a second major linear cluster, separated from the mineral cluster.

According to one feature of the invention, a ternary diagram, derived from spectral reflectance libraries convolved to the bandwidths of particular bands from an applicable multispectral sensor system (e.g. Landsat TM), will display point clusters defining separable regions of a plurality of landcover themes.

According to another feature of the invention, a computer-graphics ternary diagram has a real-time link to a computer-displayed image, through a lookup table. This allows selected pixels in the image to be identified as particular points in the ternary diagram and, conversely, pixels corresponding to selected points in the ternary diagram can be highlighted in the image. This reciprocal functionality allows the identification of targets in the image and/or the generation of spectrally-derived thematic maps of groundcover.

According to another feature of the invention, schemas can be constructed to automatically classify an image into themes. The schemas can be customized for particular goals.

In still another feature of the invention, ternary diagrams can be used to empirically correct for variations in solar illumination and atmospheric absorption and scattering.

Other objects, features, and advantages will be readily apparent.

BRIEF DESCRIPTION OF THE DRAWINGS

In the drawings, closely related figures have the same number but different alphabetic suffixes.

The various advantages of Ternary Multispectral Analysis will become apparent to those skilled in the art after studying the following specification and by reference to the drawings, in which:

FIG. 3 shows a ternary diagram with general segment boundaries between major reflectance targets such as vegetation, minerals, and soils for Landsat TM bands 4, 7, and 1.

Figure 1A:
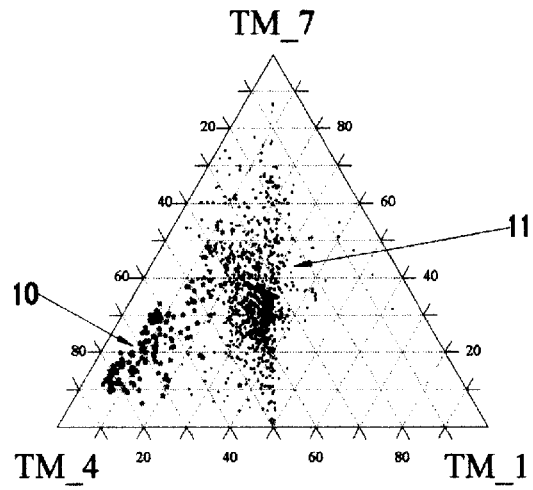
FIG. 1A shows a triangular plot of minerals and vegetation obtained from laboratory spectral libraries convolved to the bandwidths of Landsat TM bands 4, 7, and 1.

REFERENCE NUMERALS IN DRAWINGS 10 vegetation cluster
11 mineral cluster
12 bisector
13 temperate-region plants
14 arid-region plants
15 desert soils
16 senescent plants and litter
17 non-silicate minerals
18 felsic, rock-forming minerals
19 enstatite pyroxenes
20 evaporite minerals
21 snow and ice
22 pure water
23 image data files
24 computer (CPU)
25 computer input devices
26 band choices
27 image/diagram control choice
28 read image data
29 test for data EOF
30 choice for raw/corrected pixel
31 reflectance correction
32 calculate percentages
33 plot points
34 display in diagram window
35 monitor (display device)
36 release control
37 select diagram/library option
38 select region of interest
39 read image data
40 test for data EOF
41 calculate reflectance
42 calculate percentages
43 create LUT
44 test for tolerance
45 highlight pixels
46 display in image window
47 select library entries
48 read library
49 spectral library
50 test if all spectra read
51 mineral alignment band
52 vegetation alignment band
53 combined alignment band
54 vegetation alignment band
55 mineral alignment band

DESCRIPTION OF THE PREFERRED EMBODIMENT

1. Overview

Conventionally, a ternary diagram is displayed with one of the sides parallel to the bottom of the display medium, as though the triangle were resting on a base. However, the orientation of the triangle or the order of assignment of end-members only changes the appearance in the same manner as rotating a photograph or observing a photograph in a mirror. The fundamental relationships between the data clusters are only rotated or reflected, not transformed. Therefore, the preferred embodiment will be presented in the context of the conventional display.

Three multispectral images, hereafter referred to as bands, are selected from a plurality of bands available from an imaging multispectral sensor such as the Landsat Thematic Mapper (TM). Each of the pixels (picture elements), from each of the three digital image bands are read (ingested) from the storage media by a computer under programmatic control. A new floating-point value is calculated for each pixel representing its relative percentage compared to the whole (i.e. EQ. 1: $Percentage_1(x,y)=DN_1(x,y)/(DN_1(x,y)+DN_2(x,y)+DN_3(x,y))$; $Percentage_2(x,y)=DN_2(x,y)/(DN_1(x,y)+DN_2(x,y)+DN_3(x,y))$; $Percentage_3(x,y)=DN_3(x,y)/(DN_1(x,y)+DN_2(x,y)+DN_3(x,y))$. $DN_n$ represents the digital number of a pixel, usually, but not necessarily, a byte value; n represents one of the three selected bands, and; (x,y) indicates a pixel at a particular spatial location $\{x,y\}$. If the image data have been preconverted to reflectance, then the data will be floating-point values between 0 and 1, instead of binary bytes.

It is a consequence of the characteristics of ternary diagrams that if two of the percentage values are calculated, the third is automatically determined by plotting the two known values. Hence, it is not actually necessary to calculate all three percentage values as above (i.e. EQ. 2: $Percentage_3(x,y)=100-(Percentage_1(x,y)+Percentage_2(x,y))$ ) to plot a point.

A look-up table (LUT) is created where the new, derivative ternary-percentage values ($Percentage_n$) for the plurality of pixels converted are linked to the positions of the original pixels. The sequential, indexed position in the LUT corresponds to the relative position of the image pixel in the sequential image file. One may choose to display all pixels, all pixels from a delineated region of interest (ROI), or only a representative sample from either.

This is important: Not only is a ternary diagram created showing the distribution of pixels in the triangular feature space, but every point in the ternary diagram corresponds to a known location in the original image. Hence, one may either highlight pixels in the image that correspond to a particular point or region(s) in the ternary diagram or, conversely, select a pixel or ROI in the image and highlight the corresponding points in the ternary diagram. This latter process allows one to identify what the materials are in a region of interest in the image.

2. Physical Basis of the Invention

The key to successful classification of multispectral remote sensing imagery is to select a feature space that results in distinct, separable clusters of pixels that are representative of different classes or themes. Particular combinations of Landsat TM bands, plotted pixel by pixel on a ternary diagram, produce a strong discrimination between organic and non-organic reflectors. Furthermore, with these particular combinations, the plotted points representing mineral reflectors cluster along one line bisecting the triangle, allowing various mineral anion and cation groups (e.g. silicates or borates) to be identified along the cluster. The plant species similarly plot in a diffuse cluster along one edge of the ternary diagram, providing discrimination of different plants such as grasses, shrubs, and deciduous or evergreen trees. The band choices are critical. Using the six reflective (non-thermal) bands of Landsat TM, there are 20 different combinations (order being significant) of three bands that can potentially be used. However, only six combinations, as shown in FIGS. 1 and 2, provide useable plots. Other band combinations result in undifferentiable clusters of points, with vegetation plotting amidst the mineral point-cloud.

The optimum selection of bands to use is as follows:
1) a near-infrared (NIR) band (e.g.TM 4);
2) a mid-infrared (MIR) band (e.g.TM 5 or 7), and;
3) a visible band (e.g.TM 1, 2, or 3).

The NIR band is principally used to discriminate vegetation types and separate them from minerals. The MIR band is used to discriminate minerals. The visible band is used to discriminate water, and to disperse the vegetation and mineral clusters at approximately right angles to their general trend, The following table lists the nominal bandpasses for the reflective TM bands:

| Band 1 | 0.45–0.52 $\mu$m | (blue-green) |
|---|---|---|
| Band 2 | 0.52–0.60 $\mu$m | (green) |
| Band 3 | 0.63–0.69 $\mu$m | (red) |
| Band 4 | 0.76–0.90 $\mu$m | (NIR) |
| Band 5 | 1.55–1.75 $\mu$m | (MIR) |
| Band 7 | 2.08–2.35 $\mu$m | (MIR) |

Bands from other sensor systems that have approximately the same spectral bandpass-centers as the Thematic Mapper bands may be used similarly. Hyperspectral sensors may have their bands convolved to correspond to the TM bandpasses or a single representative, narrow band within each of the TM bandpasses may be used in lieu of the TM bands. If using hyperspectral imagery, the best discrimination for a particular mineral would result if a band were selected from within the MIR regions that corresponds to a distinctive absorption or reflectance feature in that mineral's spectrum, if one exists.

The French SPOT Image satellite, SPOT 4, does not have bands equivalent to TM band 1 or TM band 7. Therefore, the use of SPOT 4 XS imagery narrows the available choices to TM 4, 5, and 3 or 2 equivalents. The older SPOT satellites also do not have the equivalent of TM band 5; so, imagery from SPOT 1, 2, and 3 can not be used.

For selecting the optimum triplet of bands for Ternary Multispectral Analysis, a number of factors come into play, generally resulting in compromises. It is desirable to maximize the band variances, while minimizing the interband correlations. The optimum bands to accomplish that are slightly different for vegetation than for minerals. Therefore, the nature of the classification task or the area selected will influence the preferred choice of bands.

3. Detailed Description of FIGS. 1 to 3

FIG. 1A is a ternary plot derived from various laboratory reflectance spectra that have been convolved to the bandwidths equivalent to TM bands 4, 7, and 1. The vegetation points 10 cluster along the left edge of the triangle. The mineral points 11 generally cluster from the center of the base of the triangle upward to the apex opposite. Water can be expected to plot to the right of the mineral cluster, with pure water near the right-hand corner of the triangle. TM bands 4, 7, and 1 give the greatest dispersion for the mineral clusters, hence potentially the greatest discrimination of the minerals. However, there is also the greatest overlap between vegetation and minerals, leading to confusion between them. This choice of bands is the theoretical optimum under ideal circumstances. However, subsequent description will show why other band combinations may be necessary or preferred under various circumstances.

Figure 1B:
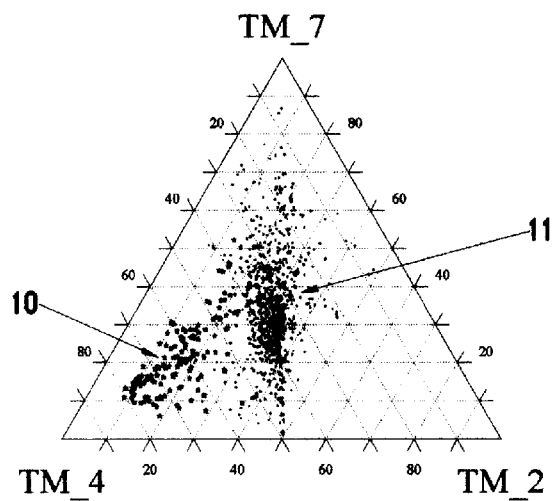
FIG. 1B shows a triangular plot of minerals and vegetation obtained from laboratory spectral reflectance libraries convolved to the bandwidths of Landsat TM bands 4, 7, and 2.
Figure 1C:
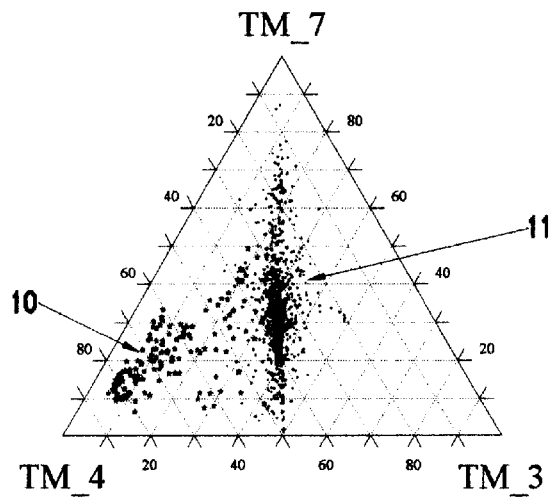
FIG. 1C shows a triangular plot of minerals and vegetation obtained from laboratory spectral reflectance libraries convolved to the bandwidths of Landsat TM bands 4, 7, and 3.

FIG. 1B is a ternary plot derived from the same laboratory reflectance spectra as above, convolved to the bandwidth equivalents of TM bands 4, 7, and 2;

FIG. 1C is a ternary plot derived from the same laboratory reflectance spectra as above convolved to the bandwidth equivalents of TM bands 4, 7, and 3. The clusters (10 and 11) are similar to those obtained in FIG. 1A. TM bands 4, 7, and 3 give reasonably good separation between plants and minerals. However, mineral points 11 are essentially all in a fat line with only slightly greater lateral dispersion than what a TM 4, 5, and 3 combination provides.

The choice of TM bands 4, 7, and 2 seems a good compromise between 4, 7, 1 and 4, 7, 3. Another advantage of the TM 4 and 7 combinations is that images composited from the ratios will show vegetation greener than 4 and 5 bands, which will be more yellow.

Figure 2A:
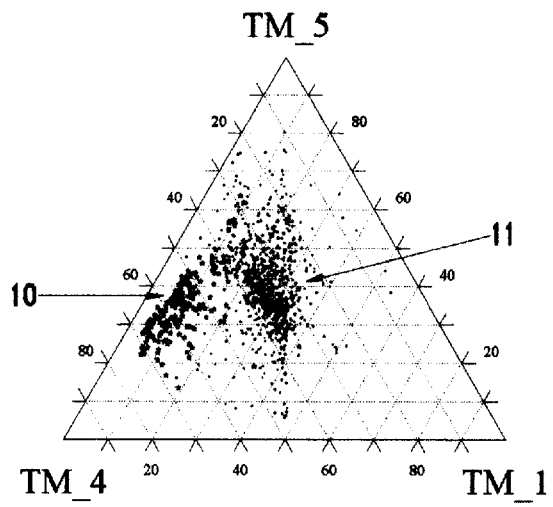
FIG. 2A shows a triangular plot of minerals and vegetation obtained from laboratory spectral reflectance libraries convolved to the bandwidths of Landsat TM bands 4, 5, and 1.
Figure 2B:
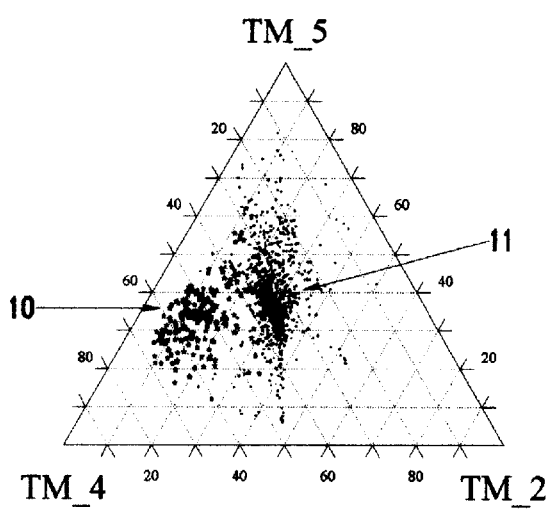
FIG. 2B shows a triangular plot of minerals and vegetation obtained from laboratory spectral reflectance libraries convolved to the bandwidths of Landsat TM bands 4, 5, and 2.

FIG. 2A is a ternary plot derived from various laboratory reflectance spectra convolved to the bandwidth equivalents of TM bands 4, 5, and 1; FIG. 2B is a ternary plot derived from the same laboratory reflectance spectra as above convolved to the bandwidth equivalents of TM bands 4, 5, and 2.

Figure 2C:
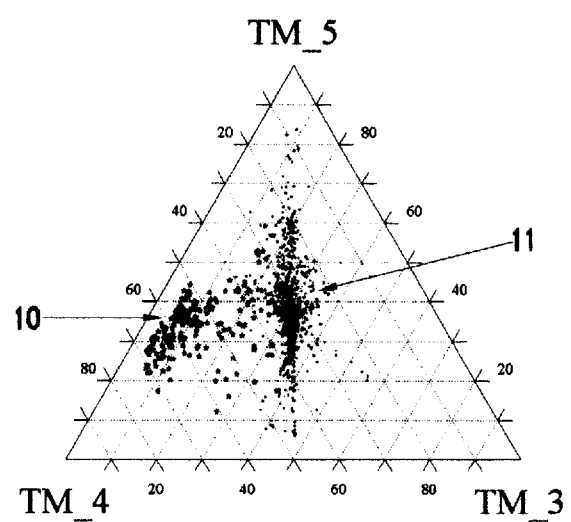
FIG. 2C shows a triangular plot of minerals and vegetation obtained from laboratory spectral reflectance libraries convolved to the bandwidths of Landsat TM bands 4, 5, and 3.

FIG. 2C is a ternary plot derived from the same laboratory reflectance spectra as above convolved to the equivalent of TM bands 4, 5, and 3. This particular band combination is unique because the vegetation 10 and mineral 11 clusters are the most linearized. The use of TM bands 4, 5, and 3 for image interpretation offers the advantage that any points that lie between the vegetation cluster 10 and the mineral cluster 11 are most probably mixed-pixels.

The use of TM bands 4, 5, and 2 has greater mineral dispersion than 4, 5, 3. However, there is more overlap with the mineral cluster and vegetation cluster with 4, 5, 2 than with 4, 5, 3. TM bands 4, 5, and 3 also provide less dispersion of the vegetation than 4, 5, 2. However, TM bands 4, 5, and 3 do have the additional unique property of distinctly linearizing the enstatite (hypersthene-bronzite) pyroxene mineral solid-solution series the best of all.

The use of TM band 7 produces a longer theoretical mineral-cluster 11 than TM band 5 and moves the vegetation cluster 10 farther away. However, examination of 2D spectral graphs indicates that many times the relative positions of spectral lines are interchanged between bands 5 and 7. The mineral enstatite-offshoot line is best expressed using TM band 5 rather than band 7. Serpentine minerals (antigorite, lizardite, and chrysotile) show considerable dispersion along the TM band 5 axis. This offers the potential for mineralogical/chemical differentiation in what is usually rendered in images as a dark, nondescript lithologic unit. If masking is employed, so that only pixels from the serpentinite body are plotted, then it may be possible to classify the body into spectrally distinct regions.

Because the two main clusters—vegetation 10 and mineral 11—are each elongated along the direction of the MIR-band axis, each of these clusters can be further subdivided into groups.

FIG. 3 shows a ternary diagram plot derived from various laboratory reflectance spectra that have been convolved to the bandwidths equivalent to TM bands 4, 7, and 1. In this plot, further discrimination of the various plant and mineral groups is shown, along with approximate segment boundaries (shown in magenta) to create a sample of possible thematic classes. This is not intended as the only possibility, only one example of a plurality of possibilities, determined by the classification requirements.

Within the vegetation cluster 10, pine trees and other evergreens lie at the end of the cluster with the smallest MIR band values and largest NIR values. Broad-leaf deciduous trees occupy the center of the cluster, with leafy plants such as commercial vegetables generally being farther along the line of the cluster; these are shown in FIG. 3 as temperate-region plants 13. Arid-region plants 14 tend to plot closer to the mineral cluster. Senescent plants, bark, and litter 16 can be found merging into the mineral cluster at the extreme low NIR, high MIR end.

Desert soils 15 are shown intermixed with the top half of the mineral cluster 11 and with arid-region plants 14 and litter 16. Desert soils 15 plot in an elliptical cluster, parallel to the main mineral cluster 11, but to the left of the bisector 12 (yellow line) and slightly higher than the felsic mineral cluster 18.

Virtually all common rock-forming silicates (as well as limestone and dolomite) cluster near the center of the ternary diagram. The abundant rock-forming minerals 8 such as feldspars, quartz, calcite, and dolomite tend to cluster very tightly between 30 and 40 percent for a TM band 4, 5, 3 triad. A TM band 4,7,2 triad is only slightlye more dispersed. The composite plot of all felsic minerals 8 is largely restricted to the range of 25 to 45 percent MIR with the use of TM band 5.

Most silicates plot from 20 to 70 percent along the mineral line for the use of TM 7 and 20 to 60 percent with the use of TM 5. The tectosilicates are restricted to a range of about 20 to 40 percent MIR contribution, along the mineral line. However, the other silicate structural groups overly them.

Iron-bearing silicates, sulfates 7, and oxides 7 (listed under "Reference Numerals" as "non-silicate minerals" tend to be at the end of cluster 11 with high MIR values.

There is a notable deviation from the general mineral line; it is a separate, distinct line at an acute angle to the bisector. This line represents the enstatite (hypersthene-bronzite) pyroxene solid-solution series 19. Fortuitously, it is on the side of mineral cluster 11 opposite from vegetation cluster 10. It does, however, intrude into the region characterized by the identification of water bodies. The rest of the inosilicates plot upward along bisector 12.

As a general rule, for the preferred band combinations, (e.g. TM 4, 7, & 2 or TM 4, 5, & 3) minerals that are green(ish) to the human eye tend to plot on and to the right of the bisector 12, while red(ish) minerals tend to plot to the left. Minerals that are white or colorless are exclusively below the 50 percent line of the TM 7 or TM 5 percentage; most are below the 40 percent line.

Within mineral cluster 11, evaporite minerals 20 such as borates and halides occupy the end of the cluster with the smallest MIR-band values. Borates plot from zero to 20 percent along the mineral-cluster line for the use of TM 7 and 5 percent to 30 percent along the line for the use of TM 5. These values represent the percentage contribution of the MIR band. Some carbonates also plot between 5 and 15 percent along the line with TM 7, although most cluster around 30 percent. Halides plot from 10 to 35 percent along the mineral line with TM 7 and from 20 to 35 percent with TM 5. Sulfates are restricted to plotting between 0 and 42 percent along the mineral line for TM 7 use; they extend from 5 to 50 percent along the mineral line for TM 5 use. Generally, points that plot at the base of the mineral line (low MIR values) can be expected to be evaporites 20.

All oxides (except water and ice) plot high (20 to 90%) and along, or significantly to the left of bisector 12. Pure water 22 plots at the extreme right-hand tip of the triangle, represented by the percentage of the visible band. Water with sediment loads will plot intermediate between pure water 22 and the mineral cluster 11. The position will be determined by the type and amount of sediment. Snow and ice 21 plots adjacent to and to the right of the evaporite minerals 20.

Typical secondary gossan-minerals plot from about 38 to 59 percent MIR with the use of TM 5. Sulfides have a greater variance along the mineral line, ranging from just under 20 percent to just under 60 percent with TM band 7. The use of TM band 5 restricts the lower range to about 29 percent. Noteworthy, is that the distribution of sulfides about bisector 12 (mineral line) of the triangle is approximately symmetrical for a TM band 5 plot. While for a TM band 7 plot, there is a greater dispersion on the left side towards an increasing TM band 4 percentage.

Copper-bearing minerals are an anomalous group in that many of them plot high and to the right of bisector 12.

One can expect that since monomineralic outcrops are rare, most mineral pixels will plot near the center of the mineral cluster. That is because even if a uniform rock outcrop were to dominate a pixel, the pixel is still inherently a mixture of the minerals constituting the rock. This is a problem confronting even hyperspectral systems, where destructive interference of the reflection spectra tend to flatten the resultant spectrum, obscuring absorption features. However, it is the uncommon monomineralic outcrops that are often of economic value. Additionally, the extreme width of the theoretical mineral cluster 11 is largely the result of the influence of relatively uncommon minerals that rarely, if ever, occur as substantial monomineralic outcrops.

Since many plants and plant communities have open canopies, the soil below is often visible, resulting in pixels that have values that are a composite of the vegetation and soil. These are commonly referred to as mixed-pixels. The result is that in real-world situations, the vegetation tends to plot closer to the mineral cluster than one would find with using laboratory spectra of the plant leaves only.

The overlap that occurs between vegetation cluster 10 and mineral cluster 11 points derived from laboratory spectral libraries is typically attributable to senescent plants and litter, and dead or dying non-arid region plants 16. The region between vegetation cluster 10 and mineral cluster 11 is occupied also by arid-region plants 14, soils 15, and potentially mixed-pixels composed of both plants and bare rock or soil exposures. If the area being studied is not arid, then obviously one is not looking at arid-region plants. Therefore, the points most likely represent mixed-pixels. One may use the position to estimate the percentage of plant cover.

Arid-region vegetation rarely covers more than 20% to 30% of the ground. Therefore, the vegetation's effect on the position of soil or mineral points will be substantially less than vegetation in humid areas. The mixed-pixel effect is less. The mineral points are translated a shorter distance and therefore will be easier to correctly identify. Further, the fact that typical desert vegetation is located intermediate between the mineral cluster and humid-climate vegetation give it less weight in translating soil and mineral points.

For locating any particular mineral in an image (other than the hypersthene/bronzite species), a band combination such as TM 4, 7, and 2, which disperses the mineral cluster into a broader cloud, is preferred over a TM 4, 5, 3 combination because there should be fewer false-positives. TM bands 4, 7, and 1 would be even better, but Rayleigh scattering is most severe in the blue region of the electromagnetic spectrum (TM band 1) and therefore may require corrections that reduce the reliability of the segmentation of the image's ternary diagram. TM band 2 is a good compromise for the minimal-correction band 3, (which generates a thinner cloud, approaching a line in shape) and band 1 (which gives maximum dispersion but is most in need of scattering correction). However, using either band 1 or 2 reduces the certainty of apparent mixed-pixel points lying intermediate between the vegetation cluster and the bisector of the ternary diagram. They may actually be mineral outcrops.

Therefore, assuming that if one can perform good atmospheric corrections, and one can accept false-positives that are overlapping vegetation, the TM 4, 7, 1 band combination is best for identifying or locating minerals. Actually, the same can be said of vegetation. Although, all of the combinations using TM band 7 have similar dispersions for vegetation.

TM bands 1 and 2 have more severe Rayleigh scattering than TM band 3 and therefore may be more difficult to correct in scenes. The lateral variance in the mineral points increases as one progresses from TM band 3 to TM band 1. Depending on where the scene is located and what mineral groups one is interested in, the scattering may or may not be a problem. However, the use of TM band 1 or 2 will probably do a better job of discriminating and identifying water than would TM band 3.

The shorter the wavelength used for the visible band, the more Rayleigh scattering present, reducing the contrast and thus variance. The potential problems with effective atmospheric correction of TM band 1, and inevitable reduction in variance and signal-to-noise ratio (SNR) may mitigate against the practical use of TM 1.

There is a similar penalty to be paid at the longest wavelengths. The description has centered on the theoretical clusters derived from laboratory-derived spectral libraries. There is less radiant energy emitted by the Sun at TM band 7 wavelengths than at TM 5, resulting in less recorded variance and a consequent lower SNR that may make the practical application less effective than theoretical considerations would suggest.

4. Example of Actual Use of Invention—FIG. 4

Figure 4A:
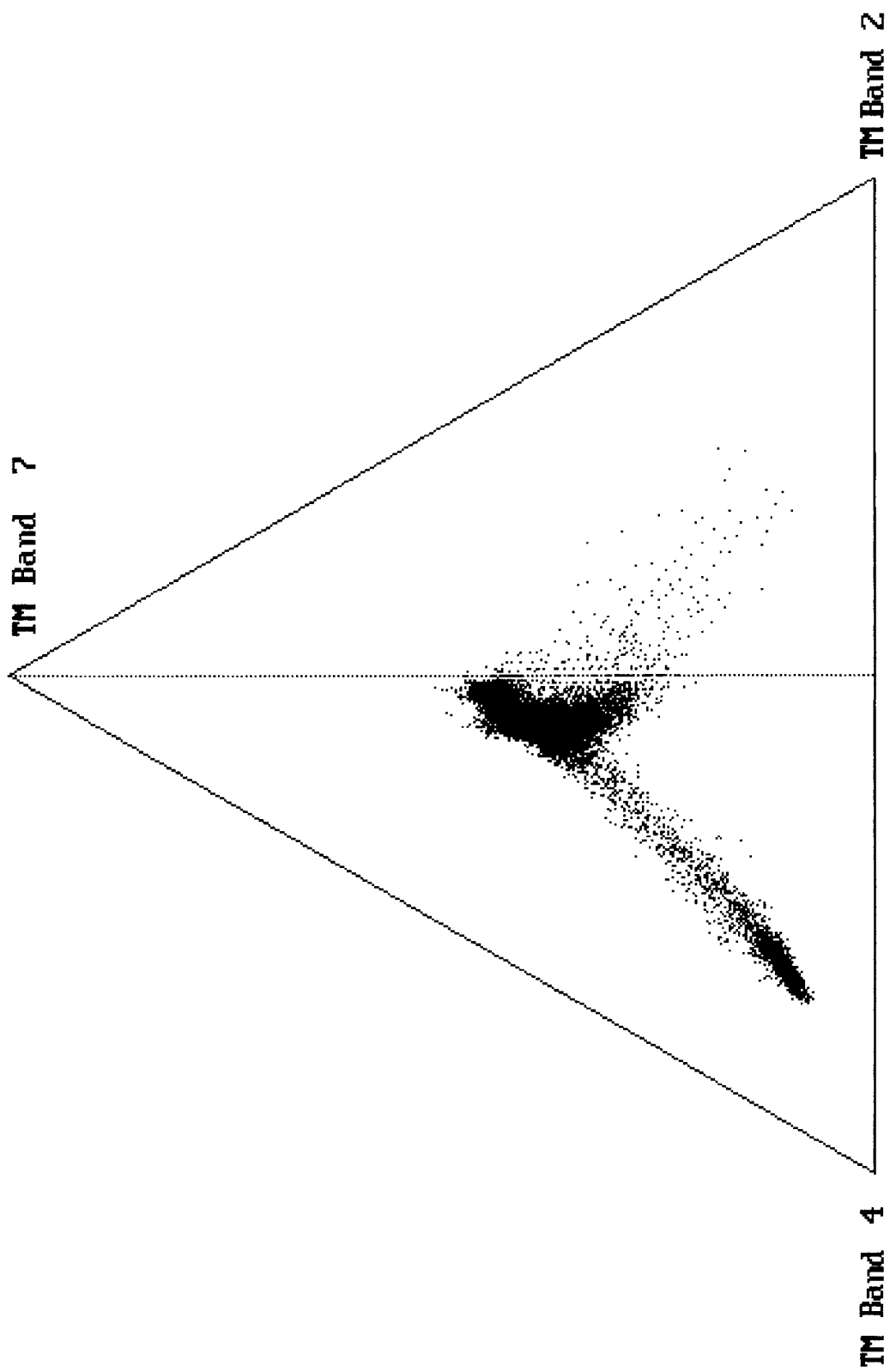
FIG. 4A shows a triangular plot of a typical Landsat scene for TM bands 4, 7, and 2, using raw digital numbers.

FIG. 4A is a triangular plot of actual raw TM data from bands 4, 7, and 2. The data are from a typical U.S. southwestern desert scene containing some irrigated agriculture. The percentage marks and grid lines have been omitted. It displays the characteristic vegetation cluster on the lower-left and mineral cluster (predominantly mineral soils) along the vertical, with a string of connecting mixed pixels. Additionally, there are points in the right center that indicate muddy irrigation water. No atmospheric corrections have been applied.

Figure 4B:
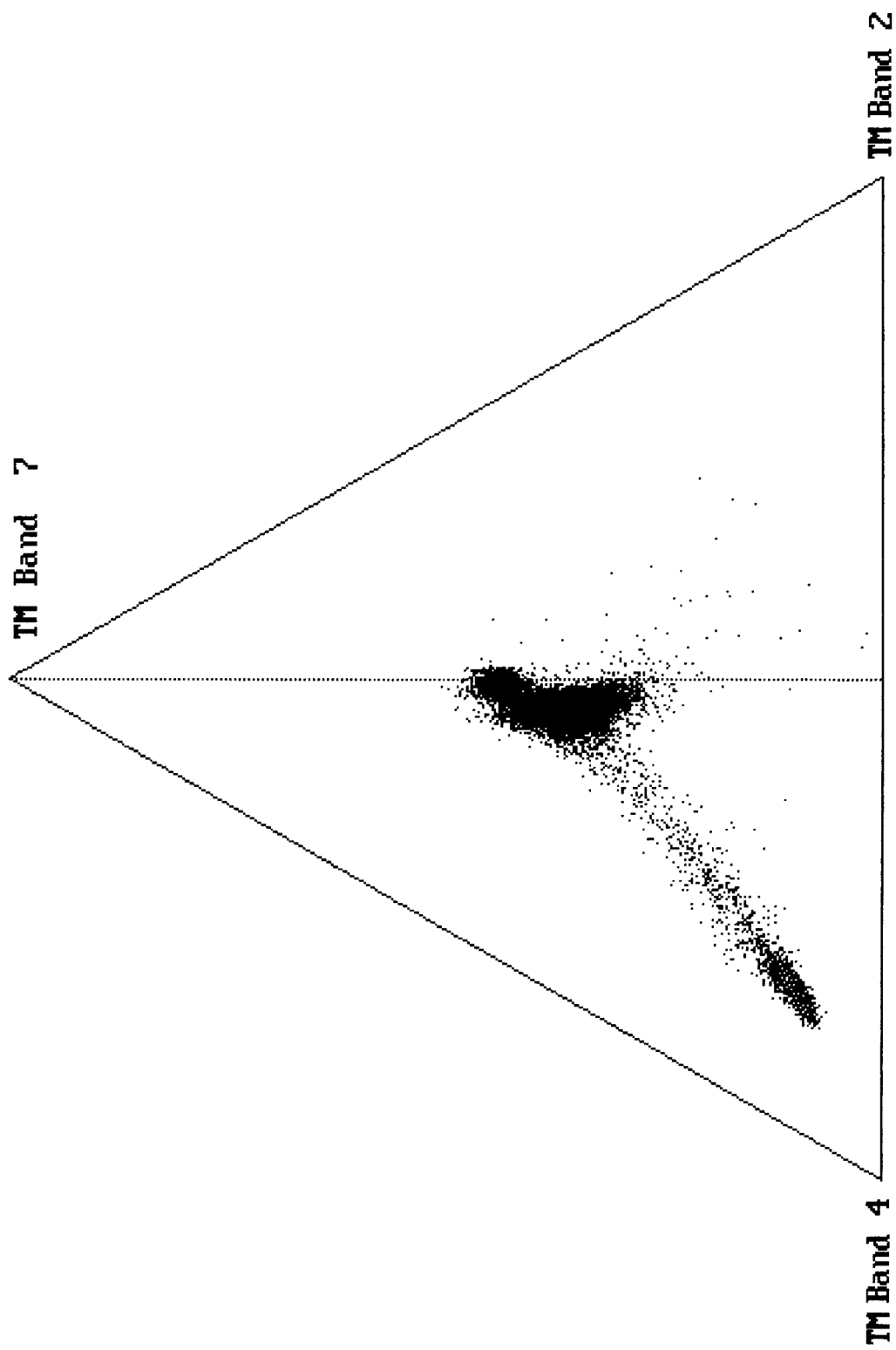
FIG. 4B shows a triangular plot of a typical Landsat scene for TM bands 4, 7, and 2, using values converted to exoatmospheric reflectance.

FIG. 4B is a triangular plot of TM data from bands 4, 7, and 2, that have been converted to exoatmospheric reflectance for the same scene as FIG. 4A. The correction used the metadata and algorithms provided by EOSAT for exoatmospheric correction. A correction of −8 DNs was applied to the TM band 2 data to correct for Rayleigh scattering in the green region of the electromagnetic spectrum. The point clusters are very similar to FIG. 4A.

5. Description of Computer Flow-Diagram—FIG. 5

Figure 5:
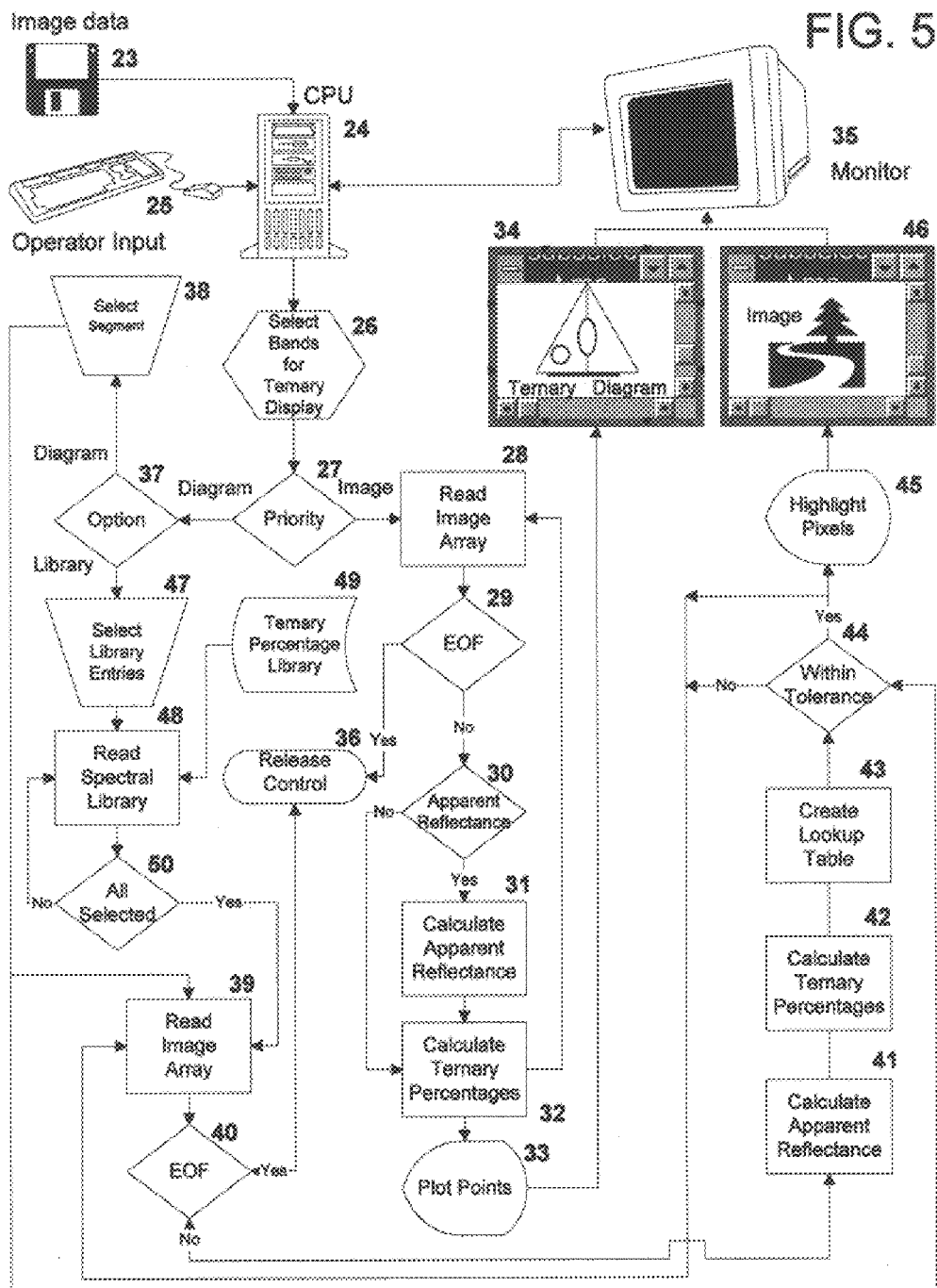
FIG. 5 shows a schematic flow diagram of the processes involved in the general computer processing.

FIG. 5 shows a general schematic flow-diagram of the essential elements of the disclosed methods and processes, as implemented for computer use. Multispectral Image Data 23, commonly stored as files on removable media, are imported into a Computer (CPU) 24. Image Data 23 are ingested by an image-processing program employing Ternary Multispectral Analysis, and stored as an array of data. An operator, using typical Input Devices 25, such as a keyboard and mouse, invokes the Ternary Multispectral Analysis module and Selects 26 bands to be used for ternary diagram display. The operator then decides whether to Select 27 image or diagram Interaction priority.

If the image option is chosen, the stored multispectral data array is Read 28 one pixel at a time. At least one set of a three-band triad, as previously chosen 26, is read from the array. An End Of File (EOF) Test 29 or similar check to verify completion of data reading is performed. Next, the operator may make a Decision 30 to use raw data or convert the band values for each pixel to apparent reflectance. This Decision 30 step is not a critical element since Ternary Multispectral Analysis can be used in this mode with either raw data or apparent reflectance data. However, the flexibility of being able to make the choice and not be limited by the particular implementation adds value through increased functionality. If it is decided to work with apparent reflectance values, the next step is to Convert 31 the raw DNs for each pixel to apparent reflectance. Whether the last step is omitted or not, the next process is to Convert 32 the pixel values to ternary percentages in the manner explained above (EQ. 1) in the description of ternary diagrams. Points are then Plotted 33 on the ternary diagram Display 34 in the graphical user interface Window displayed on a computer Monitor 35. An alternative embodiment might be to use a second monitor or to sequentially alternate between the image and graphical display. When all of the image pixels have been read and plotted the function will terminate and Release 36 control to allow other actions by the operator.

It is assumed that the above procedures have been performed at least once so that there is a ternary diagram Display 34 of either all the image pixels, or a subset selected by the operator. The plurality of pixels chosen is not critical as any image may be considered a superset of smaller tiles or irregular polygons. However, it does add flexibility and utility if an operator can select a region of interest (ROI) interactively from a displayed image and only plot points on the ternary diagram that correspond to those pixels that lie within the confines of the ROI. It allows identification of those pixels exclusively that fall within the bounds of the ROI.

The operator then next makes a Choice 37 of a library or diagram option. If the diagram option is chosen, the operator then would use cursor keys, mouse, or some other Input Device 25 to select one or more pixels, referred to here as a Segment 38 from displayed ternary diagram 34. If a very small number of points is chosen, it may be desirable to assign a tolerance level for later acceptance of a match. The image data array will again be Read 39. Once more, EOF Test 40 will be applied to conclude data reading and Release 36 control. The process of Calculating 41 an apparent reflectance might be the next step, but can and should be omitted if ternary display 34 is derived from raw (DN) pixel values. The next step is to Calculate 42 ternary percentages for every triad selected. A look-up table (LUT) is then Filled 43 so that there is a correspondence between the sequential position in the LUT and the sequential position of the pixels in the image data array. The data in the LUT consists of the ternary percentages for one or more triads of bands. The next step is to Check 44 to see if the pixel ternary percentages are within the ternary diagram ROI, or acceptance tolerance for a small number of pixels. If the pixel ternary values pass the acceptance test, then the corresponding pixel in the image is Highlighted 45 in some way. One way would be to replace the corresponding pixel in image Display 46 with a brightly colored pixel, or blink the pixel on and off, or both. This iterative process of reading, converting, filling the LUT, testing, and replacing pixels continues until all the image pixels have been examined.

If at diagram-library Choice 37, the library option had been chosen, the operator would be expected to Select 47 one or more entries, by name, from a Library 49 of spectra. These selections could be mineral species, mineral groups, plant species, plant groups, man-made objects, etc. The selection is limited only by the extent of spectra placed into storage for use by the computer program. The selection could be by pointing at a list or typing in one or more names. The method of choice is not critical. Both approaches might be desirable in the same implementation. The spectra are then Read 48 from spectral Library 49. The spectra could be entered as reflectance values, but it would save computational time if they were preconverted to percentages for all the expected triads of bands to be used. Therefore, the conversion step is omitted from the flow chart and it is assumed that preconversion has been performed. A Check 50 is performed to be sure that all requested spectra are retrieved. At this point, starting with the Read 39 image array function, the logic flow follows the same path as for the ROI Option 38, except that apparent reflectance Conversion 41 is mandatory. However, tolerance Test 44 is performed against the library spectra selected, rather than the segment region or point(s) from the ternary diagram.

6. Description of Automatic Classification—FIG. 6

Figure 6:
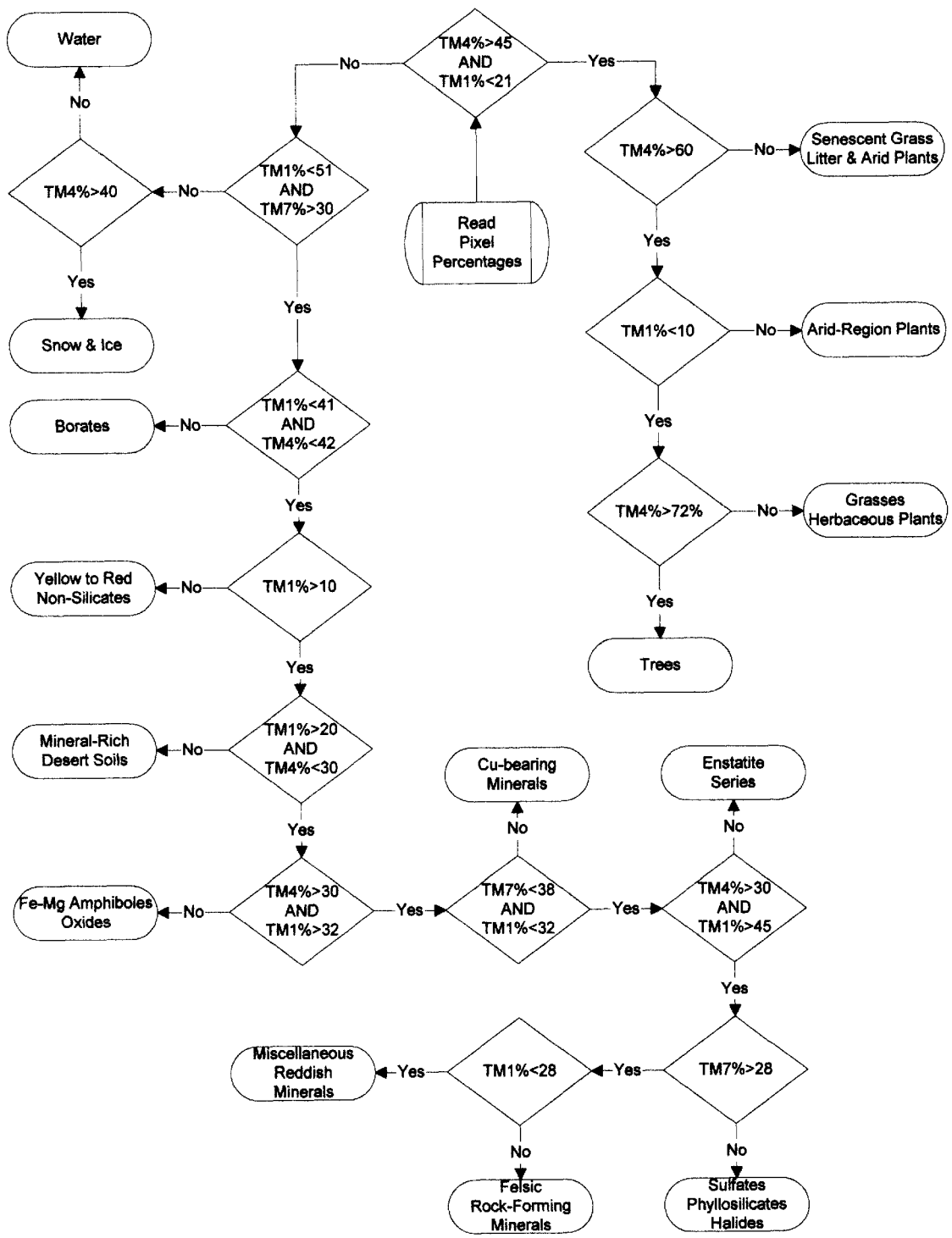
FIG. 6 shows a flow diagram of an automatic classification schema.

FIG. 6 shows a sample logic flow-diagram of one of a multitude of algorithmic schema that can be developed for automatic computer classification of multispectral imagery with Ternary Multispectral Analysis. The schema is based on sequential IF . . . THEN comparative (GREATER THAN, LESS THAN) logic tests used with Boolean AND tests to segment the triangular feature space a priori, using ternary percentages. For illustration, the first diamond-shaped box with the text, "TM4%>45 AND TM1%<21," should be interpreted as follows: If a pixel value for the TM band 4 image is greater than 45 percent, and the value for the same pixel in the TM band 1 image is less than 21 percent, the test provides a "YES" result. The pixel therefore is representative of a plant and is tested further in the same manner (downward in the right-hand column) to determine the general class. Had the initial test provided a "NO" result, the pixel would have been considered representative of a mineral and then be tested further (downward in the left-hand column) to determine the mineral class. All subsequent diamond-shaped boxes work in the same manner, just using different values and bands. The approach requires the conversion of the imagery to apparent reflectance values before the tests are applied. The order, number of tests, and value relationships are variable, being determined by the classification requirements of a particular task. The important element of the schema is that it is a hierarchical classification that facilitates rapid computation because it only requires comparisons of one or two values at each step to define the feature-space segment. However, there is no fundamental reason why the third value could not be used, e.g. to trade off speed for accuracy.

7. Atmospheric Corrections—FIG. 7

Figure 7A:
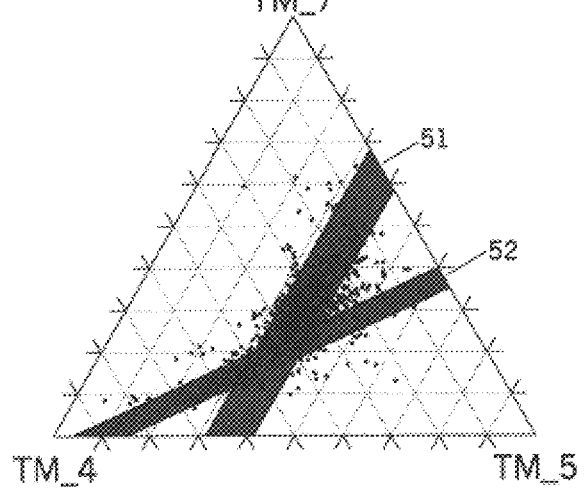
FIG. 7A shows vegetation and mineral alignment bands for TM bands 4, 7, and 5.

FIG. 7A shows a ternary diagram of TM bands 4, 7, and 5 with both mineral and vegetation libraries plotted. A mineral alignment band 51 and a vegetation alignment band 52 are to be used for verifying proper atmospheric corrections.

Figure 7B:
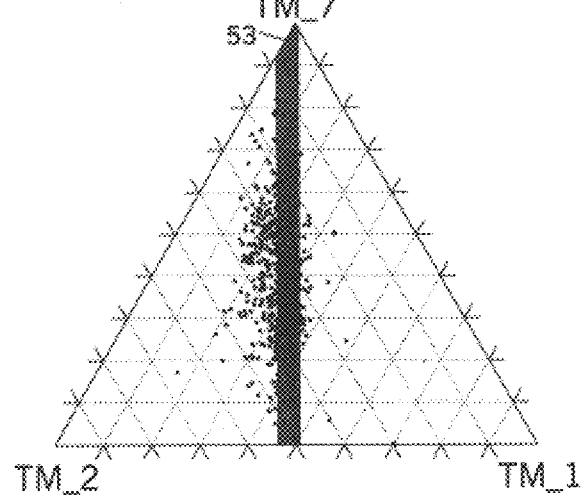
FIG. 7B shows combined alignment bands for TM bands 2, 7, and 1.

FIG. 7B shows a ternary diagram of TM bands 2, 7, and 1 with both libraries again plotted. Since the vegetation and mineral clusters plot over each other, there is only a single alignment band 53 for this combination.

Figure 7C:
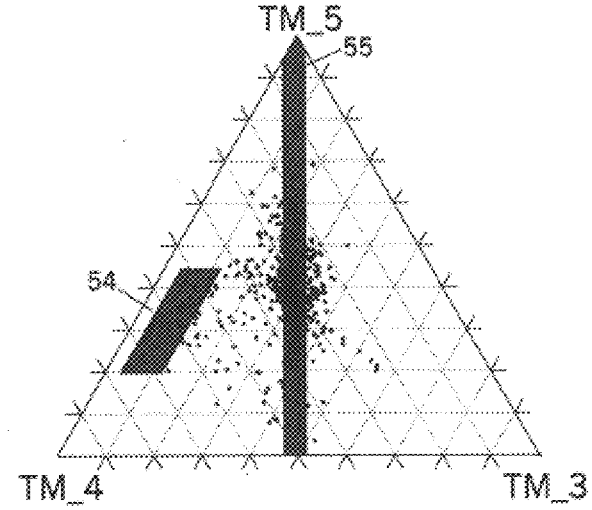
FIG. 7C shows vegetation and mineral alignment bands for TM bands 4, 5, and 3.

FIG. 7C shows a ternary diagram of TM bands 4, 5, and 3 with both libraries plotted. A vegetation alignment band 54 (coincident with 10 in FIG. 2C) and a mineral alignment band 55 (coincident with 11 in FIG. 2C) are shown.

PREFERRED EMBODIMENT—OPERATION

1. Basic Operation

Generally, the first thing that an analyst would do is display the ternary diagram using raw image data to get an overview of the distribution of the type of ground cover. The approximate shape and location of point clusters can be used to infer what the materials are. That might be followed by plotting the ternary diagram from image pixels converted to either exoatmospheric reflectance or apparent (ground) reflectance to obtain patterns that more closely match the theoretical shapes and locations as shown in FIGS. 1 and 2. The ternary diagram can have class boundaries superimposed, optionally displayable, in the manner shown in FIG. 3 or as implied by FIG. 6, to aid in the visual identification of the pixel class(es). The interpretation of the spectral class represented by the plotted points can be assisted if the plotted points are colored in relation to their position, which is governed by their respective ternary percentages. This can be done by assigning the color whereby the red-green-blue components of the resulting hue are directly proportional to the mid-IR, near-IR, and visible percentages, respectively. That is, a ternary diagram point with a large TM band 4 percentage will appear greenish, a point with a large TM band 5 or 7 percentage will appear reddish, and a point with a large TM band 1, 2, or 3 percentage will appear bluish. The exact hue will be determined by the relative proportions of each of the three band contributions.

The real-time linkage between the displayed image(s) and ternary diagram(s) through a look-up table (LUT) allows one to specify a point or region in the ternary diagram, and identify (with a bright color and/or blinking pixels) the spatial location(s) in the image that correspond(s) to that specified region of interest. This allows one to select a particular mineral or type of vegetation and find where in the image it might occur. In order to account for mineral and plant variations in reflectance arising out of compositional differences and to compensate for measurement errors, it is generally advisable to plot the desired target material from more than one spectral library, if available.

The displayed image(s) may be false-color composites of raw (binary byte DN) data, radiance, exoatmospheric reflectance, or corrected apparent-reflectance. However, for matching against spectral library entries, the best results will be obtained if ternary percentages derived from apparent reflectance or at least exoatmospheric-reflectance pixel values are loaded into the LUT.

Expanding the target-seeking operation from a single region in the ternary diagram to a plurality of regions, and assigning different colors to the image pixels that correspond to each of the plurality of ternary diagram regions defined, will result in a thematic map. For example, all image pixels that correspond to the vegetation region in the ternary diagram might be colored green, all pixels corresponding to minerals might be colored red, pixels intermediate between the two regions might be colored yellow, and pixels corresponding to the water region in the ternary diagram might be colored blue. To achieve finer discrimination, smaller regions or segments can be defined, with an increase in the number of display colors used to differentiate the thematic classes. This process is analogous to the selection of training sites in conventional supervised classification, except that the sites are defined within the ternary diagram feature-space instead of being defined in the spatial-domain feature-space of the image.

A plurality of hierarchical schema, under computer control, may be devised to automatically classify an image, using virtual segmentation boundaries based on the ternary percentages of the optimum band triads; FIG. 6 is one example of such a schema.

2. Examples of Operation

One way in which the ternary diagram can be used in exploration would be to select a particular mineral from a spectral library (convolved to the band widths of the sensor used for acquiring the imagery) and plot the point(s) on the ternary diagram. Then have the computer program search for spectrally similar pixels, in the LUT, composed of pixels converted from either exoatmospheric reflectance or apparent reflectance. It is probable that there would be no exact matches. The tolerance can be increased by expanding the search to include a region within the ternary diagram enclosed by an ellipse with the major axis parallel to the 'mineral line' and enclosing the plotted point(s) of interest. The size of the ellipse can be increased repeatedly. Eventually, some target pixels will be identified. They may be false-positive indications, though. However, it may still indicate favorable regions for examination with sensors with higher spatial or spectral resolution, or reconnaissance on the ground.

Alternatively, if one finds it necessary or desirable to work with the raw image, composed of the DNs as provided by the data supplier, one can select a point and/or region on the ground that is of interest. Such a feature might be a known mine, known mineral outcrop, known agricultural crop, or any other target of verified character. The selected target will be displayed on the ternary diagram. Then, by instructing the program to find all points in the image with ternary ratios equal to or approximately equal to the original target, new targets will be identified in the image. As above, an approach would be to place an ellipse, defining a region of interest in the ternary diagram, around the selected point(s), with the long axis of the ellipse parallel to the cluster of the target class (i.e. vertical for minerals and at 600 for vegetation for this embodiment). The length of the long axis and eccentricity can be varied to increase the tolerance of acceptance for display in the image.

The search strategy can be refined further by using more than one ternary diagram at a time. As an example, some sulfides plot in very different places on a TM band 4,7,3 combination than they do with a TM band 4,5,3 combination. To take advantage of this, one would plot the particular sulfide of interest from the TM-bandwidth convolved mineral library. A tolerance would be selected by placing a bounded area around the point(s) such as previously described with the ellipse method above. The computer program will then employ an extended look-up table, incorporating the additional information of the percentages for the second virtual ternary diagram. When an image pixel falls within the tolerance range of the selected library entry (e.g. sulfide species) for one diagram triad, (e.g. TM 4,7,3), the program will also check to confirm that the image pixel also is within the tolerance range for the second selected triad (e.g. TM 4,5,3). Effectively, a logical AND test is being performed. This approach may be extended to a plurality of diagram triads.

However, it is not advisable to use most of the possible triads for AND-testing for the same reasons that it is not advisable to use them singly—principally, the vegetation and mineral clusters overlap, resulting in poor discrimination and false-positive results. Therefore, the six combinations shown in FIGS. 1 and 2 are the optimum choices.

3. Mixed-Pixel Problem

At Landsat TM resolution, most of the image pixels will be mixed. For example, a metamorphic skarn is not monomineralic; it will be composed of several calc-silicate minerals. An approach to exploration then would be to assume what the two or three most abundant minerals might be, e.g. epidote and grossularite and place an ellipse on the Triangular diagram with the foci of the ellipse coincident with the centroids of epidote and grossularite points, as determined from a spectral library for minerals. The image would then be searched with variable eccentricity ellipses for all matches that fall within the perimeter of the ellipses. This will allow identification of composition end-members as well as the intermediate composition mixed-pixels.

Mixed-pixels are always a problem in thematic classification. Since mineral and vegetation groups are linearized, only groups at the ends of the clusters can be assumed to be pure. Intermediate points could possibly be the result of inhomogeneous reflectors. However, depending on the manner in which the groups are ordered, mixing may be mineralogically improbable. Similarly, plant communities composed of the vegetation end-members may be improbable for the particular geographic region, leading to the conclusion that the pixels are actually representative of the vegetation on the ground.

Ternary Multispectral Analysis may be most accurate when incorporated with a GIS or an Artificial Intelligence Expert program such as Prospector, to eliminate the improbable interpretations, based on what is known about the area and what is known about mineral and plant associations.

A more serious—and common—problem will be mixed-pixels consisting of vegetation and minerals. However, an advantage of using Ternary Multispectral Analysis is that mixed-pixels, composed of mineral and plant end-members, are apparent by the intermediate position between the mineral and plant clusters. This effect is most pronounced with the TM band 4, 5, and 3 or 4, 7, and 3 combinations because of the strong linearization of minerals and distinct separation of minerals and plants. If either the mineral or the vegetation end-member can be identified from the presence of pure pixels, or a priori knowledge about the geology or biology, then the other end-member and proportion can be estimated by extrapolating the line connecting the known end-member and the mixed-pixel. If either end-member is of particular interest, ground reconnaissance of the areas of the mixed pixels may be warranted.

If one of the mixed-pixel end-members is of no interest, such as the soil background, and one wishes to derive a thematic map of plant types, the line connecting the mixed-pixel with the local soil end-member can be extrapolated to the plant region on the edge of the ternary diagram and the image mixed-pixels can be replaced with pixels corresponding to the DNs of those plants.

The ternary diagram also offers a new type of vegetation index that is specific to particular plant species or plant communities. The relative distance of the mixed- pixel along the line connecting the two end members may be used as an estimate of the relative proportion of vegetative ground cover. The distance between the soil/mineral end-member and the plant end-member is measured. The proportional distance, along the transect connecting the two end-members, of a particular pixel represents the percent of ground cover of the vegetation. If the plant is prone to complete coverage in at least some areas, then pixels will be available to establish the end-member position of the plant. If not, then the position can be established by plotting a point from the spectral library or entered into the program from field spectrometer measurements. An alternate approach is to extrapolate any linear cluster of mixed-pixels and estimate the position of the vegetation end-member to be where the extrapolated line intercepts the extreme left edge of vegetation cluster 10.

The great distance between the pure water point and the mineral-soil clusters on the ternary diagram provides opportunity for a sensitive estimate of turbidity and approximate composition of the suspended sediment in a manner similar to above.

4. Atmospheric Corrections

Experience has shown that plotting the ternary percentages derived from the raw digital numbers (DN) in the Landsat TM images typically provides useable results. However, to achieve improved target identification and more reliable estimates of proportions, it is desirable to convert the raw DNs to apparent reflectance. This requires using the calibration metadata supplied with the imagery to convert to absolute radiance, correcting for sun elevation and distance and solar irradiance variation with wavelength, and to finally convert the DNs to normalized exoatmospheric reflectance. By additionally correcting for atmospheric absorption and scattering, a value approximating actual reflectance may be derived from the exoatmospheric reflectance. Plotting the 3-band ratios derived from the apparent reflectance values provides the most accurate placement of clusters and individual points in the triangular feature-space for comparison with the idealized locations derived from laboratory-derived reflectance values.

As with hyperspectral image analysis, accurate correction for atmospheric absorption and scattering effects are crucial to accurate and fine discrimination of mineral and plant species. Ideally, a radiative transfer model (RTM) should be used. Lacking ready access to an RTM or the requisite environmental data for the time of image acquisition, a first-order correction can be made by correcting for additive-haze Rayleigh scattering. In the dark-object subtraction method described by Chavez (1989), a dark area in the blue-green or green band—such as a deep, clear lake or a deeply shadowed gorge—should have a zero (0) radiance value, or close to it. Subtract the smallest value in a visible-wavelength band from all pixel radiance values in that band. Since Rayleigh scattering varies approximately inversely with the $4^{th}$ power of the wavelength for clear skies, the other two bands can be adjusted from the empirically observed bias. Observe the effect on the points plotted on the ternary diagram. If too large a bias is removed, (likely with this approach) then the clusters will be shifted away from the corner with the visible-band ratio on the ternary diagram. In particular, mineral cluster 11 will not fall along bisector 12. If no correction is applied (or insufficient bias removed) then one can expect the clusters to be shifted toward the triangle apex with the visible-band ratio values. As shown in FIGS. 1, 2, 3, and 4, that would be the bottom, right-hand corner of the triangle. An approximate approach to correcting for Rayleigh scattering would be to correct only the visible wavelength band used (TM 1, 2, or 3), since Rayleigh scattering in the IR is usually negligible.

To empirically establish atmospheric correction parameters, an approach that would be helpful would be to plot triads that produce linear clusters irrespective of the specific surface materials. A plot of TM bands 4, 7, and 5; 2, 7 and 1; and 4, 5, and 3 provide examples of linear clusters that can be used for absorption and scattering corrections. Plots of these triads are shown as FIGS. 7A, 7B, and 7C. These would serve as guides to indicate if the corrections have been done correctly. If all three bands have been corrected properly, the point clusters obtained from the corrected image bands should fall on or within the alignment bands for all three diagrams.

An example of how the above can be accomplished would be a software implementation that facilitates the rapid determination of atmospheric corrections utilizing a mouse-cursor-actuated slider on screen. This will adjust gain (multiplicative haze) and bias (additive haze) and thus move the plotted clusters in real-time to align the cluster(s) with a pre-drawn line(s) or band(s) on the ternary diagram(s) and then record the parameters required to affect the translation (s). These parameters will be used in subsequent cluster plots for analysis. While bands 1, 2, and 3 are the only ones requiring potentially significant corrections for Rayleigh scattering, multiplicative haze (Mie scattering) corrections for higher bands have proven difficult to deal with. One could display three different ternary diagrams (FIGS. 7A, 7B, and 7C) simultaneously and have them linked together in real-time. Thereby, when the slider was adjusted for a particular band, one could observe the effect on the plots using all three bands of the bands selected for Ternary Multispectral Analysis.

5. Standardized Images

If, when the ternary percentages are calculated for loading 43 into the LUT, the values are also written to a sequential file, transformed images will be created. If those percentage-images are subsequently displayed in a manner that the derivative image obtained from the visible band is directed to the blue gun of the CRT (cathode ray tube), the NIR band is directed to the green gun, and the Mid-IR band is directed to the red gun, one will have created a standardized image with a number of desirable properties, such as:

1) Vegetation will appear in shades of green;
2) Water will appear in shades of blue;
3) Most common rock-forming minerals will be gray;
4) Minerals of economic importance, such as oxides, will be reddish;
5) Borates will be cyan, and;
6) Copper minerals will be in a magenta region.

However, the real advantage is that interpreters can extract composition information from a false-color image that is predictable in color associations. Performing a contrast stretch on the standardized image will increase the saturation at the expense of shifting the hue slightly and distorting the shape of the ternary diagram clusters. Therefore, if the analyst decides to do a contrast stretch, it is not recommended that the resulting image be used subsequently for creating a new ternary diagram.

CONCLUSIONS, RAMIFICATIONS, AND SCOPE

Accordingly, the reader will see that the Ternary Multispectral Analysis method and process expands the field of multispectral image processing by providing new and different approaches to identifying targets, creating thematic maps, performing atmospheric corrections, unmixing pixels, and displaying standardized-color false-color images. Highly accurate thematic maps are possible, based on spectral characteristics of the ground features, using fewer bands than typically are employed.

Furthermore, Ternary Multispectral Analysis has the additional advantages that it:

(a) reduces the level of skill and experience required for multispectral analysis;
(b) allows for automatic hierarchical thematic classification;
(c) allows interactive generation of thematic maps without need for a photointerpreter, ground truth, or more than 3 TM bands;
(d) minimizes the impact of the 'shadow class' through an inherent normalization;
(e) allows detection of specific spectral targets;
(f) establishes a method to estimate end-member proportions in a mixed-pixel;
(g) provides a means to accomplish empirical atmospheric corrections;
(h) provides for displaying false-color images with standard colors;
(i) establishes a method to calculate species-specific vegetation indices; and
(j) allows the estimation of relative turbidity, and type of sediment in water.

While my above description contains many specificities, these should not be construed as limitations on the scope of the invention, but rather as an exemplification of one preferred embodiment thereof, with minor variations. Many other embodiments are possible. For example, the use of an adaptation of the automatic classification schema (FIG. 6) may allow the automatic estimation of cloud cover percentage of an image for quality control purposes. Another example is that if an analyst wants to work with a false-color, principle components image (Karhunen-Loeve transform), notorious for having unpredictable colors, a ternary diagram linked to the image will assist the analyst in interpreting the type of ground cover. One last example is, by spatially linking two ternary diagrams in real-time to an image on the computer display, the distinctly mixed-pixels in a TM 4, 5, and 3 combination can be high-lighted simultaneously on a higher variance, TM 4, 7, and 1 or 2 combination for estimating proportions of end-members.

Widely varying embodiments of the invention will suggest themselves to those having skill in the art without departing from the scope and essence of the following claims. Accordingly, the scope of the Ternary Multispectral Analysis invention should be determined not by the embodiments illustrated, but by the appended claims and their legal equivalents.

What I claim is:

1. A method of identifying spectrally-distinctive reflective ground targets, represented by a plurality of pixels in multispectral imagery, comprising the following steps:

(a) selecting at least three image bands from a multitude of coregistered multispectral bands, wherein said selected bands consist of a band in the visible, a band in the near-infrared, and a band in the mid-infrared portion of the electromagnetic spectrum;
(b) transformation means for correcting said pixels' original values for sensor calibration, solar spectrum characteristics, sensor and illumination geometry, and atmospheric scattering and absorption, thereby resulting in values that closely approximate true reflectance, herein referred to as apparent reflectance values;
(c) conversion means for converting plurality of said pixels' apparent reflectance values to ternary percentages, wherein each member of a triad of percentages is the fractional part, of the sum, of one pixels' values from each of said selected bands;
(d) plotting indicia on a conventional ternary diagram or triangular plot, wherein each pixel of the plurality of said pixels has an indicium corresponding to said pixel;
(e) determining a plurality of spectral-class segment boundaries by visual inspection, from a reference ternary diagram containing plotted points or indicia obtained from a spectral library of reflectors of interest convolved to the bandwidth of the multispectral sensor used, wherein said boundaries are changeable and determined by class-resolution requirements of a classification task;
(f) transferring said changeable boundaries to a triangular-shaped, transparent template that is congruent with said ternary diagram; and (g) superimposing said template over said ternary diagram to delineate plurality of said spectral-class boundaries;

whereby, the position of the indicia on the ternary diagram, with respect to the plurality of the enclosing boundaries of said superimposed template, constrains the identification of the corresponding image pixels to be members of the spectral class plotted on said reference ternary diagram, within said enclosing boundaries, thus identifying said pixels.

2. The method of identifying spectrally-distinctive reflective ground targets, as set forth in claim 1, step (e) wherein the template boundaries determination further includes, optionally:
   (a) spectral-class boundary determination means empirically derived from actual spectral ground-truth to establish the position on a master ternary diagram suitable for use with the imagery being analyzed; and
   (b) spectral-class boundary determination means empirically derived from photointerpretation-derived ground-truth of imagery, to establish the position on a master ternary diagram suitable for use with the imagery being analyzed.

3. The general method of identifying spectrally-distinctive reflective ground targets, as set forth in claim 1, comprising the following software-controlled steps:
   (a) providing an input means to ingest multispectral image data;
   (b) providing a storage means to store programmatic control and data;
   (c) reading said image data into storage;
   (d) providing computer input devices of known type, thereby enabling an operator to select requisite image bands interactively;
   (e) reading a subset of multispectral image data, comprising said selected bands, into an array;
   (f) reading pixels values from said array;
   (g) correcting said pixel values, thereby obtaining apparent reflectance values;
   (h) displaying said pixel values as a matrix, thereby forming an image;
   (i) selecting a region of interest in said image, interactively;
   (j) converting said apparent reflectance values, within said region of interest, to ternary percentages;
   (k) generating a graphical output, on a display device, in the form of a ternary diagram containing plotted points or indicia corresponding to said pixels;
   (l) displaying pre-calculated, general spectral-class segment boundaries on said ternary diagram; and
   (m) comparing indicia positions to a table of pre-determined virtual boundaries to establish finer class membership discrimination;

whereby, the steps recited above result in the semiautomatic identification of said selected sub-set of pixels through programmatic control of a general-purpose computer.

4. The method of identifying spectrally-distinctive reflective ground targets, as set forth in claim 1, wherein step (c) said pixel's initial values further include, optionally:
   (a) raw digital numbers, representing a function of radiance recorded by an overhead sensor.

5. The method of identifying spectrally-distinctive reflective ground targets, as set forth in claim 1, wherein step (c) said pixel's initial values further include, optionally:
   (a) exoatmospheric reflectance values resulting from a processing means to correct for sensor calibration, solar spectrum characteristics, and sensor and illumination geometry.

6. The method of identifying spectrally-distinctive reflective ground targets, as set forth in claim 1, wherein step (d) plotting further includes:
   (a) a coloration means to assign a color to an indicium where said color is determined by ternary percentages in a manner whereby a red component of a resulting hue is directly correlated with one percentage, a green component with another, and a blue component with the remaining percentage.

7. The method of identifying spectrally-distinctive reflective ground targets, as set forth in claim 1, wherein step (d) plotting further includes:
   (a) a coloration means to assign a color to an indicium where said color is determined by ternary percentages in a manner whereby a red component of a resulting hue is directly correlated with a mid-infrared percentage, a green component with a near-infrared percentage, and a blue component with a visible percentage.

whereby, said indicium is assigned a hue that approximates the natural hue of the ground-cover spectral class the indicium corresponds to.

8. The method of identifying spectrally-distinctive reflective ground targets, as set forth in claim 1, comprising the following software-controlled steps:
   (a) providing an input means to ingest multispectral image data;
   (b) providing storage means to store programmatic control and data;
   (c) reading said image data into storage;
   (d) providing computer input devices of known type, thereby enabling an operator to select the requisite image bands interactively;
   (e) reading a subset of multispectral image data, comprising said selected bands, into an array;
   (f) reading a plurality of pixels values from said array;
   (g) correcting said pixel values, thereby obtaining apparent reflectance values;
   (h) converting said apparent reflectance values to ternary percentages; and
   (i) writing said ternary percentages to a sequential file;

whereby, a transformed image is created, which is in machine-readable form, and can be displayed on a graphics-enabled computer; thereby, if the near-infrared percentage surrogate is directed to the green gun of a cathode ray tube, the mid-infrared percentage surrogate is directed to the red gun of a cathode ray tube, and the visible percentage surrogate is directed to the blue gun of a cathode ray tube, a standardized, false-color image will be displayed that has the desirable properties of displaying ground cover in hues approximating their natural hues.

9. A method of locating spectrally-distinctive reflective ground targets, represented by a plurality of pixels in multispectral imagery, and deriving a thematic map, comprising the following software-controlled steps:
   (a) providing an input means to ingest multispectral image data;
   (b) providing a storage means to store programmatic control and data;
   (c) reading said image data into storage;
   (d) providing computer input devices of known type, thereby enabling an operator to select requisite image bands interactively;
   (e) reading a subset of multispectral image data, comprising said selected bands, into an array;

(f) reading pixels values from said array;

(g) correcting said pixel values, thereby obtaining apparent reflectance values;

(h) displaying said pixel values as a matrix, thereby forming an image;

(i) converting said apparent reflectance values to ternary percentages;

(j) loading a lookup table, sequentially, with said ternary percentages;

(k) generating a graphical output, on a display device, in the form of a ternary diagram containing plotted points or indicia;

(l) segmenting said ternary diagram by selecting a plurality of boundaries, interactively, that defines a desired spectral class;

(m) comparing entries in said lookup table with boundaries of spectral-class segment;

(n) highlighting image pixels if said pixels correspond to said lookup table entries within said region of interest;

whereby, the steps recited above result in locating the plurality of said pixels in said image that spectrally correspond to said indicia in said selected spectral-class segment; further, the steps (l), (m) and (n), recited above, iteratively performed on the whole of the plurality of indicia, with non-overlapping segments, result in a plurality of correspondences between said segments and the plurality of said image pixels;

whereupon, assigning unique a color to each spectral class, for which there is at least one correspondence in the image pixels, results in the generation of a thematic map, depicting the types of ground cover as represented by the plurality of said spectral classes.

10. A method of locating spectrally-distinctive reflective ground targets and deriving a thematic map as set forth in claim 9, wherein steps (h), (J), (k), (m), (n), and (o) are omitted and (l) is replaced with the further steps:

(a) creating a pre-determined plurality of virtual spectral-class boundaries, comprising a plurality of test parameters, each parameter consisting of no more than two ternary percentages, which establish a boundary between two super-classes;

(b) performing hierarchical logical tests between the relative values of said virtual, spectral-class boundaries and the corresponding ternary percentages for the plurality of said image pixels;

(c) continuing said logical comparisons, with additional parameters, on the pixel along a decision tree until an identification is made;

(d) assigning an identification label, such as a number, to the pixel;

(e) writing said label to a sequential file;

(f) iterating the procedure by selecting the next pixel in sequence;

(g) continuing until all of the plurality of said pixels have been tested;

whereby, the steps recited above result in an automatic classification of said multispectral image suitable for unattended, batch processing in a volume production environment, wherein the resulting thematic map is in a machine-readable form.

11. A method of locating spectrally-distinctive reflective ground targets as set forth in claim 9, wherein step (l) is replaced with the further steps:

(a) storing a reference spectral library convolved to appropriate bandpasses;

(b) providing an interactive selection means for extracting at least one member from said reference spectral library;

(c) converting said selected spectral library member reflectance values to ternary percentages;

(d) providing a means for establishing a tolerance of acceptance of a match;

(e) comparing said spectral library member, consecutively, with every entry in said lookup table;

(f) highlighting the corresponding image pixel if said match is obtained;

(g) repeating step (e) for each additional said member of said spectral library selected;

whereby, the steps recited above result in locating the plurality of said pixels in said image that spectrally correspond to said selected member of said reference spectral library.

12. A method of interactively, empirically correcting multispectral imagery for multiplicative and additive haze and atmospheric absorption, comprising the following software-controlled steps:

(a) providing an input means to ingest multispectral image data;

(b) providing storage means to store programmatic control and data;

(c) reading said multispectral image data into storage;

(d) providing computer input devices of known type, thereby enabling an operator to select the requisite image bands interactively;

(e) reading a subset of multispectral image data, comprising said selected bands, into an array;

(f) reading pixels values from said array;

(g) converting raw image pixel-values to ternary percentages;

(h) loading a lookup table, sequentially, with said ternary percentages;

(i) duplicating said ternary percentages in a shadow lookup table;

(j) generating a graphical output, on a display device, of a plurality of different ternary diagrams containing plotted points or indicia;

(k) displaying at least one pre-determined alignment band on each of said plurality of ternary diagrams;

(l) providing interactive input means whereby an operator adjusts visible indicators of gain and bias;

(m) providing a means to record and apply adjusted gain and bias values to said ternary percentages;

(n) providing a means to update said shadow lookup table with the adjusted percentages;

(o) regenerating said graphical output comprising adjusted said indicia, on said display device, using the updated shadow lookup table;

(p) continuing said interactive adjustments until satisfactory alignment with plurality of said alignment bands is achieved;

(q) providing a means to convert final, adjusted ternary-percentage gain and bias values to values to apply directly to the raw data to obtain apparent reflectance;

whereby, said raw image data is corrected for a multitude of multiplicative and additive effects that are essential to take into account to create apparent reflectance images.

* * * * *